March 9, 1926.  
W. D. LA RUE  
SPRING MOTOR  
Filed May 14, 1924  
1,575,695  
2 Sheets-Sheet 1

INVENTOR  
William D. La Rue.  
BY John D. Myers  
ATTORNEY

March 9, 1926.

W. D. LA RUE

SPRING MOTOR

Filed May 14, 1924    2 Sheets-Sheet 2

1,575,695

INVENTOR
William D. La Rue.
BY John D. Myers
ATTORNEY

Patented Mar. 9, 1926.

1,575,695

UNITED STATES PATENT OFFICE.

WILLIAM D. LA RUE, OF PHILADELPHIA, PENNSYLVANIA, ASSIGNOR TO VICTOR TALKING MACHINE COMPANY, A CORPORATION OF NEW JERSEY.

SPRING MOTOR.

Application filed May 14, 1924. Serial No. 713,141.

*To all whom it may concern:*

Be it known that I, WILLIAM D. LA RUE, a citizen of the United States, and a resident of the city of Philadelphia, county of Philadelphia, State of Pennsylvania, have invented certain new and useful Improvements in Spring Motors, of which the following is a full, clear, and exact description, reference being had to the accompanying drawings, forming part of this specification.

My invention relates to improvements in spring motors and particularly those of the multiple-spring type, such as shown and described in Letters Patent No. 1,384,426, to I. F. Burton, and has for one of its objects to provide a simple and efficient construction in which the parts may be readily assembled or separated as desired and in which convenient access is afforded to each one of the springs so that the same may be readily placed in operative position or easily and quickly removed therefrom in case of breakage.

Another object of my invention is to provide means for obviating the difficulty and danger usually involved when a spring in coiled condition is inserted into or removed from the spring barrel.

A further object of the invention is to provide a motor in which a pair of coiled springs are mounted side by side in a single retaining ring or annular carrier whereby to form a power unit which as a whole may be inserted into or withdrawn from the spring barrel.

A still further object of the invention is to provide improved lubricating means permitting free circulation of the lubricant within the spring barrel and through the springs during the operation of the motor, means being also provided to confine the lubricant to prevent it from working out of the barrel.

My invention further includes all of the various other novel objects and features of construction and arrangement hereinafter specified.

In the accompanying drawings illustrating one embodiment of the invention, and in which similar letters of reference are used to indicate similar parts, Fig. 1 is a longitudinal section, partly in elevation, of the motor;

Figure 1:
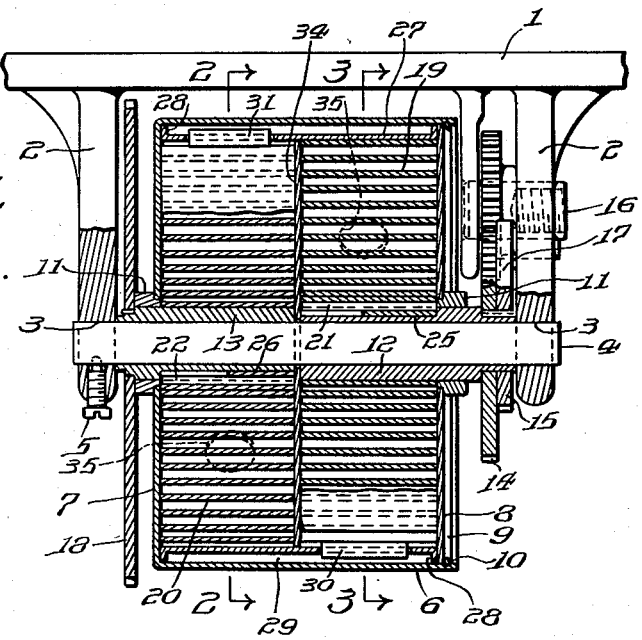

The motor consists of a suitable frame, 1, the body of which is substantially horizontal and is provided with a pair of depending arms or brackets, 2, in the lower ends of which are provided aligned bearings, 3, in which a horizontal shaft, 4, is supported. The shaft is removably held in position in the bearings by a set screw, 5.

Mounted on this shaft between the brackets is a spring barrel, having a cylindrical body portion, 6, and a closed end, 7, and open at the other end so that it is substantially cup-shaped. Snugly fitting within and closing the open end of the barrel is a cap plate, 8, normally held against withdrawal by a split ring, 9, engaging a groove, 10, formed in the inner surface of the barrel adjacent the open end thereof.

Centrally disposed in the closed end, 7, and the cap plate, 8, of the spring barrel are aligned bushings, 11, in which are journaled two sleeves, 12 and 13, positioned within the spring barrel and rotatably mounted upon the shaft 4. At their remote ends these sleeves project outwardly beyond the respective bushings, 11. A winding gear, 14, and a ratchet-wheel, 15, are fixed on the outer end of the sleeve, 12, the former constituting a part of winding mechanism, 16, suitably mounted in the motor frame, and the latter being engaged by the usual pawl, 17, also carried by the motor frame. On the outer end of the sleeve, 13, is keyed or otherwise rigidly secured a driving gear, 18, through which the power of the motor is applied.

A pair of oppositely wound coiled springs, 19 and 20, are arranged side by side within the spring barrel, and surround the sleeves, 12 and 13 respectively. The inner ends of the springs, 19 and 20, are crimped or offset as indicated at 21 and 22, respectively, to engage with shoulders, 23 and 24, formed by longitudinal grooves, 25 and 26, in the peripheries of the sleeves, 12 and 13. The shoulders, 23 and 24, face in opposite circular directions inasmuch as the springs are oppositely wound.

Both springs are mounted within a single retaining ring or annular carrier, 27, telescoped within the spring barrel and fitting between the closed end, 7, thereof and the cap plate, 8. Outturned circular flanges, 28, extend around each end of the ring and form bearings fitting the inner cylindrical surface of the spring barrel, whereby to support the retaining ring within the barrel and in concentric relation thereto with its periphery spaced from the body portion, 6, of the barrel. By means of this construction an annular channel is formed around the periphery of the ring, and in the assembled position of the parts an annular chamber, 29, is provided between the barrel, the retaining ring and the two flanges, 28. The outer ends of the springs, 19 and 20, are formed with hooks, 30 and 31 respectively, engaged with elongated slots, 32 and 33, extending through the retaining ring, the outer ends of the hooks projecting beyond and overlapping the periphery of the retaining ring and being housed within the annular chamber, 29. The two springs are kept out of contact by means of a separating plate, 34, interposed between the same and between the inner ends of the sleeves, 12 and 13, and fitting within the retaining ring.

The annular chamber, 29, serves as a reservoir for grease and other lubricant. A plurality of openings, 35, extend through the retaining ring opposite the respective springs, the said openings opposite each spring together with the corresponding slot for the outer end of such spring constituting a series of lubricating passages for the free flow of lubricant back and forth between the interior of the retaining ring and the annular chamber, 29. The two series of such passages are arranged on opposite sides of the separating plate, 34, and preferably in staggered relation to each other. It is to be noted that the flange, 28, adjacent the cap plate, 8, tends to confine the lubricant and prevent it from working out of the barrel.

Figure 2:
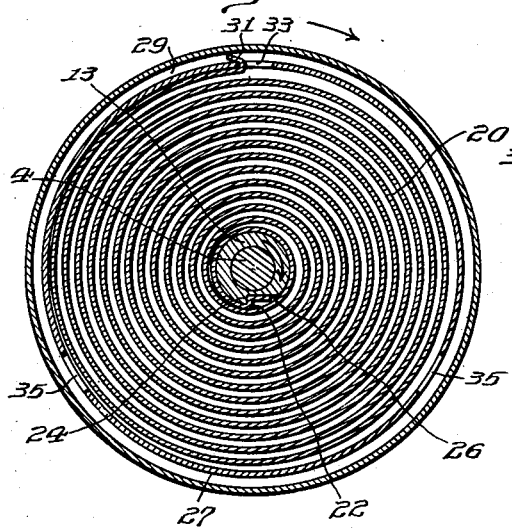
Fig. 2 is a transverse sectional view taken on the line 2—2 of Fig. 1.
Figure 3:
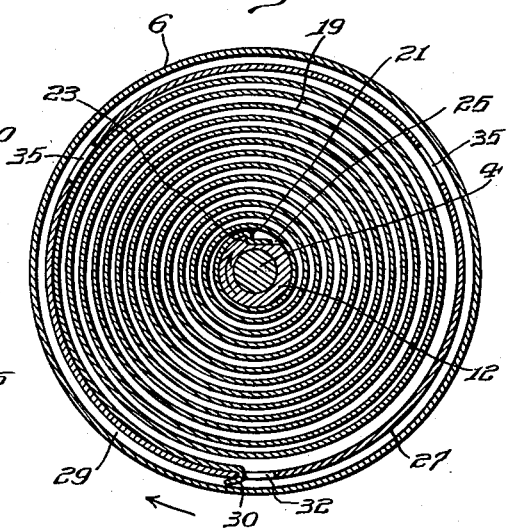
Fig. 3 is a transverse sectional view taken on the line 3—3 of Fig. 1.
Figure 4:
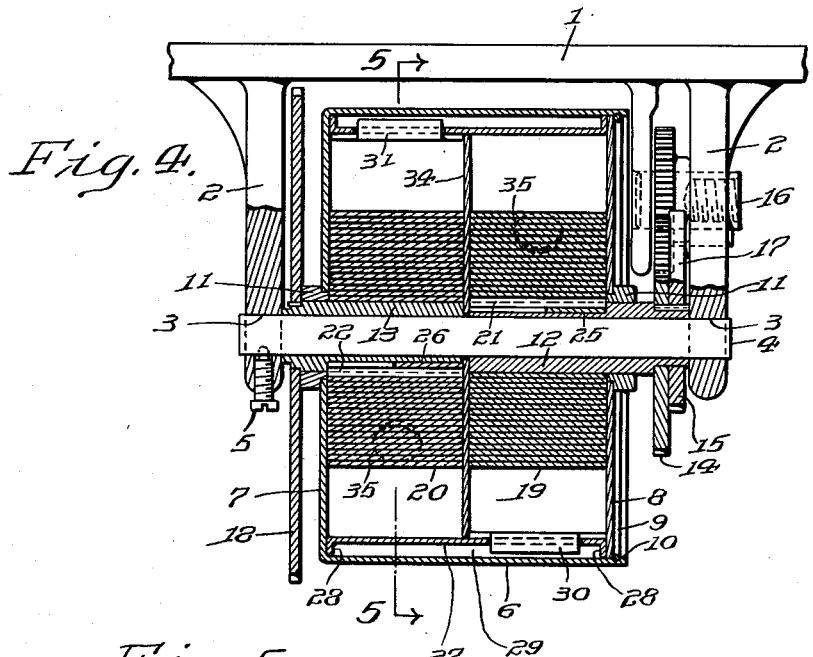
Fig. 4 is a longitudinal section, partly in elevation, similar to Fig. 1 but showing the springs wound tightly within the barrel.
Figure 5:
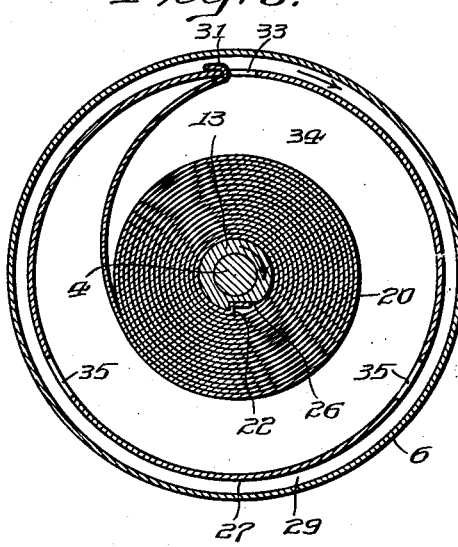
Fig. 5 is a transverse sectional view taken on the line 5—5 of Fig. 4.
Figure 6:
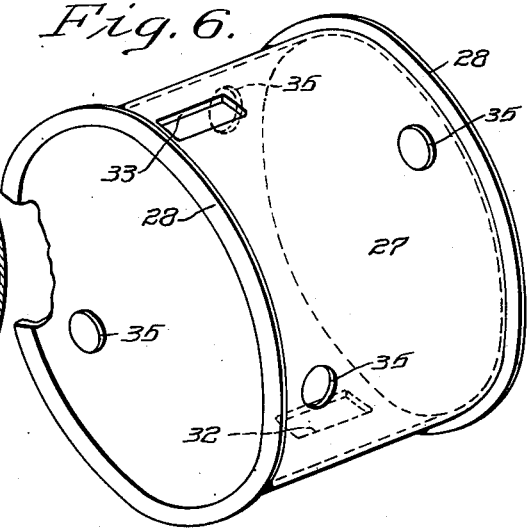
Fig. 6 is a perspective view, partly broken away, of the retaining ring or annular spring carrier.

In the operation of the motor, when the winding mechanism, 16, is actuated in the usual manner, the sleeve 12 is rotated on the shaft 4 in the direction indicated by the arrow (see Fig. 3) and winds the spring, 19, from its inner end until it is fully tensioned, the continued winding serving to rotate the retaining ring (in the direction indicated by the arrows in Figs. 2 and 3), which thus winds the spring, 20, from its outer end and around its sleeve, 13, until the springs assume substantially the position illustrated in Figs. 4 and 5. The power thus stored up is applied through the driving gear, 18, which, when released, is rotated by the sleeve, 13, in the direction indicated by the arrow (see Fig. 5), the spring, 20, unwinding from its inner end and the other parts rotating as before described, except in the reverse order, until both springs have run down. In the winding and unwinding of the springs, the lubricant passes freely back and forth through the lubricating passages, thus circulating between the annular chamber, 29, and the interior of the retaining ring and through and about the springs contained therein. The outer ends of the hooks, 30 and 31, will rotate with the retaining ring, 27, and through the annular chamber, 29, and thus tend to stir the lubricant and facilitate the circulation thereof.

The construction above described permits the parts of the motor to be readily separated, as for purposes of repair. By loosening the set screws, 5, and withdrawing the shaft, 4, from its bearings, 3, the spring barrel is released from the frame and from its position between the bracket arms, 2. The sleeves, 12 and 13, are then withdrawn longitudinally through their respective bearings, 11, the grooves, 25 and 26, permitting this free longitudinal movement of the sleeves and effecting the disengagement thereof from the offset inner ends of the springs. By removing the split ring, 9, the cap plate, 8, is released and may be withdrawn from the open end of the spring barrel, whereupon the retaining ring, 27, and the springs, 19 and 20, mounted therein may be withdrawn as a unit from the barrel and the springs thus removed from operative position therein without the difficulty and danger usually encountered in that operation through the likelihood of one of the coiled springs "getting loose."

In my construction, the springs are safely housed within the retaining ring which holds them effectually in check when they are withdrawn from the barrel, and the retaining ring, with the springs mounted therein, constitutes a power unit which as a whole is introduced into or withdrawn from the barrel as occasion requires. If one of the springs should become broken, say the spring adjacent the closed end of the barrel, it is not necessary, as in certain other constructions, to first remove the outer spring and separately remove the broken inner spring and replace it by a new one and then reassemble the outer spring, all of which requires skilled labor and cannot be conveniently accomplished in the private home. Nor is it necessary to replace the entire spring barrel and its assembled parts with a new barrel containing perfect springs. The substitution of a new power unit for one containing a broken spring may be quickly and easily effected in a private home without skilled labor and with a minimum of expense, and this is all that is necessary with my invention, which thus achieves important advantages.

It is to be noted that the retaining ring is open and unobstructed at both ends, thus affording free access to the springs when the power unit is removed from the motor. Furthermore, in the original assembly or disassembly of the power unit, the springs may be readily inserted or removed through the respective open ends of the ring, thus materially facilitating that operation. The retaining ring itself is of simple construction, and is susceptible of being easily and cheaply manufactured.

Various changes may be made in the details of construction without departing from the spirit of the invention, as defined in the appended claims.

Having thus described my invention, I claim and desire to protect by Letters Patent of the United States:

1. In a spring motor, a spring barrel, a power unit mounted within said barrel, with an annular reservoir for lubricant interposed between said unit and said barrel, and means establishing communication between said reservoir and the interior of the unit.

2. In a spring motor, a spring barrel, a retaining ring within said barrel and spaced therefrom to provide an interposed chamber for lubricant, and a spring mounted within said ring, the ring being formed with a passage for lubricant communicating with said chamber and with the interior of the ring.

3. In a spring motor, a spring barrel, a retaining ring within said barrel and spaced therefrom to provide an interposed chamber for lubricant, and a spring mounted within said ring, the ring being formed with a series of lubricating passages communicating with said chamber and with the interior of the ring adjacent said spring.

4. In a spring motor, a spring barrel, a retaining ring wthin said barrel and having spaced outstanding flanges bearing against the inner surface of the barrel and forming an annular chamber interposed between the ring and the barrel, and a spring within said retaining ring, the ring being formed with an opening therethrough between said flanges and communicating with said chamber and the interior of the ring.

5. In a spring motor, a spring barrel, a retaining ring rotatable within and independently of said barrel and spaced therefrom to provide an interposed chamber for lubricant, said ring being formed with an opening through the periphery thereof, and a spring mounted within said ring provided at one end with a hook engaged through said opening and projecting into said chamber.

6. In a spring motor, a spring barrel, a power unit mounted within said barrel and spaced therefrom to provide an interposed chamber for lubricant, one of said parts being rotatable relatively to the other, and means within said chamber and carried by said relatively rotatable part, for stirring the lubricant.

7. In a spring motor, a spring barrel opening at one end, a retaining ring within said barrel and spaced therefrom to provide an interposed chamber for lubricant, a spring mounted within the retaining ring, said ring being provided adjacent the open end of the barrel with an outstanding peripheral flange for confining the lubricant, and a removable cap plate for closing the open end of the barrel.

8. A power unit for spring motors, comprising a retaining ring provided on its periphery with an annular channel for lubricant, and a spring mounted within said ring, the ring being formed with an opening through its periphery communicating with said channel and with the interior of said ring.

9. A power unit for spring motors, comprising a retaining ring formed at its opposite ends with outstanding flanges, and a pair of springs mounted within said ring, the ring being formed between said flanges with openings through its periphery communicating with the interior of the ring adjacent the respective springs.

In testimony whereof, I have signed my name to this specification.

WILLIAM D. LA RUE.